UNITED STATES PATENT OFFICE.

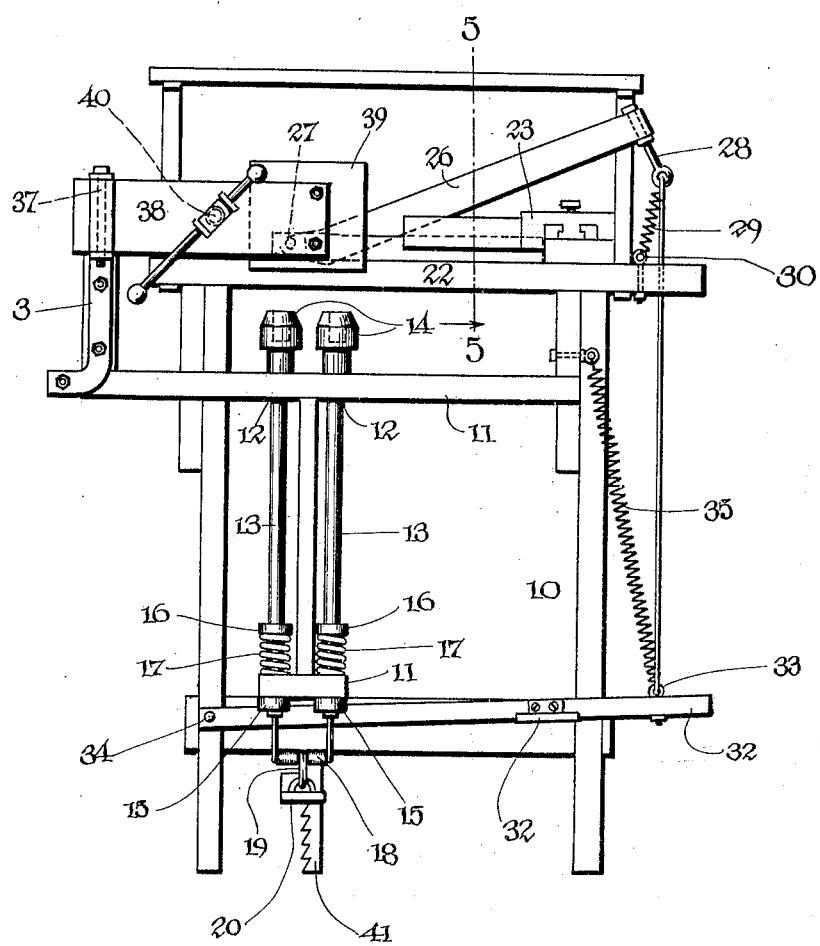

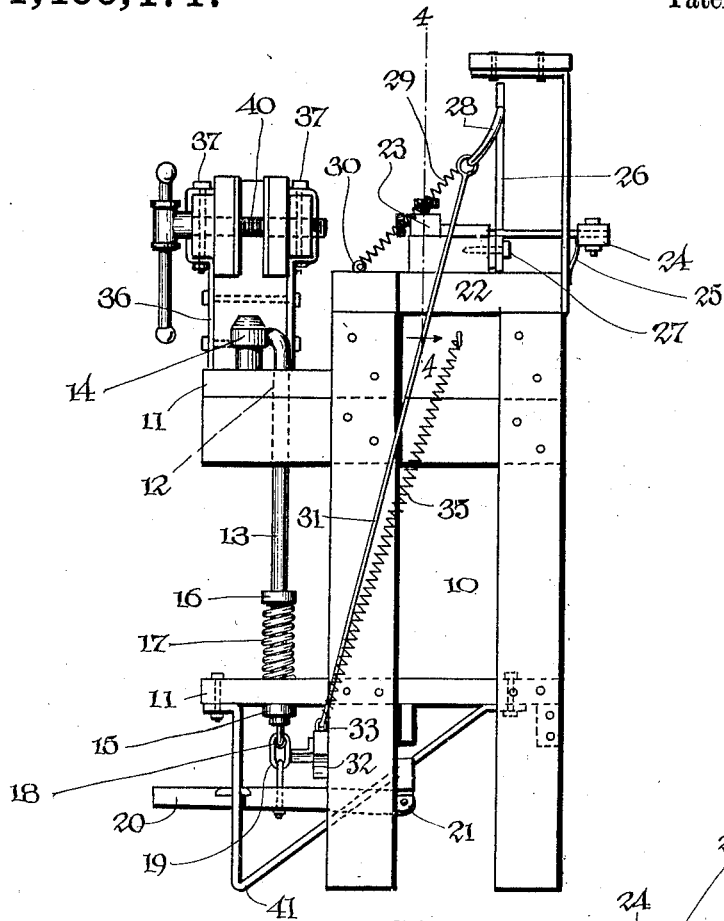
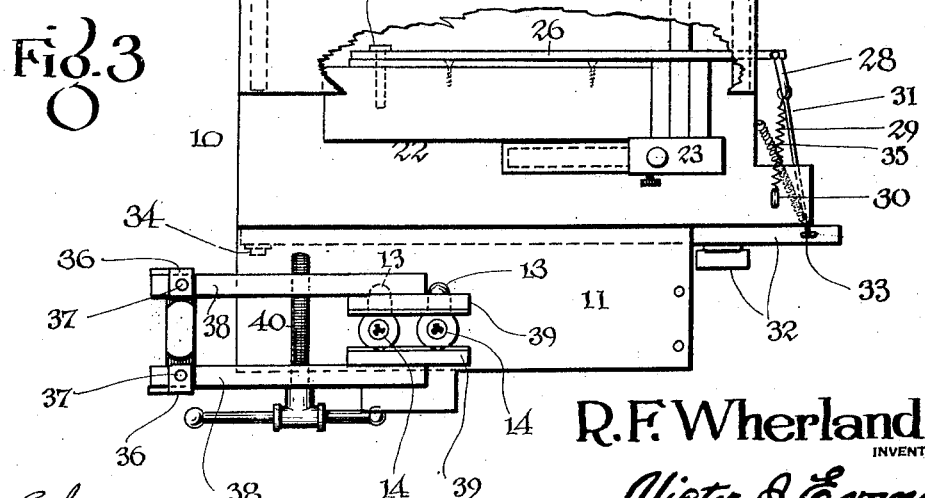

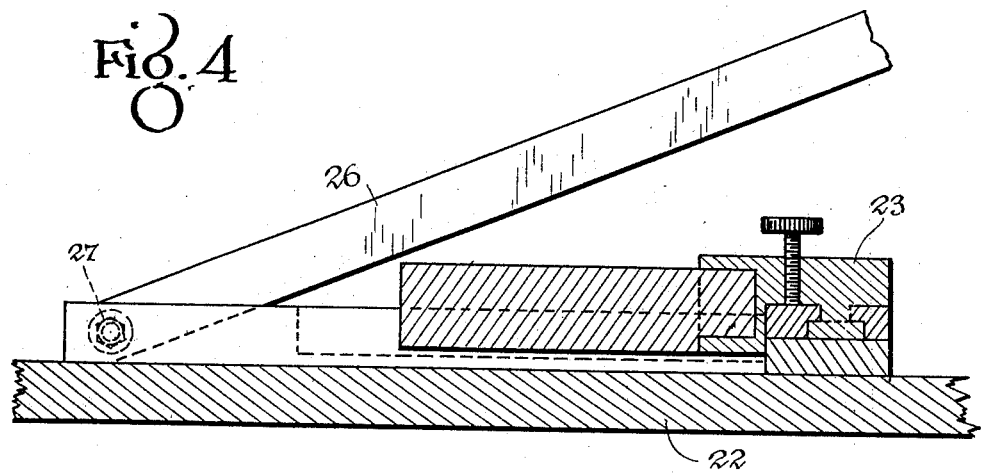
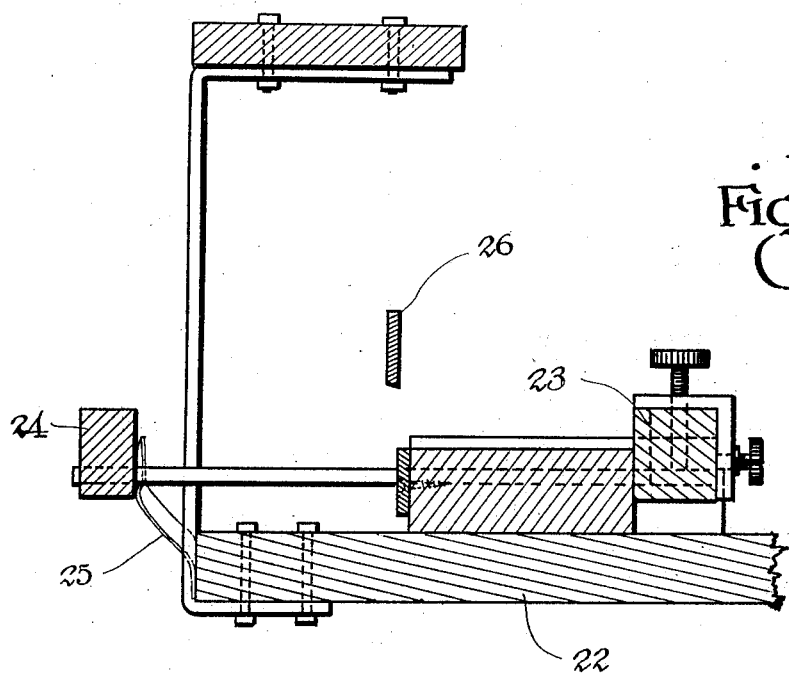

ROBERT F. WHERLAND, OF STANLEY, NORTH DAKOTA.

BATTERY-MACHINE.

1,400,471.    Specification of Letters Patent.    Patented Dec. 13, 1921.

Application filed August 7, 1920. Serial No. 401,990.

*To all whom it may concern:*

Be it known that I, ROBERT F. WHERLAND, a citizen of the United States, residing at Stanley, in the county of Mountrail and State of North Dakota, have invented new and useful Improvements in Battery-Machines, of which the following is a specification.

This invention relates to improvements in machines for the manufacture of storage batteries of the type used in the operation of motor vehicles.

An object of the invention is the provision of a machine for cutting separators for a battery, which is capable of adjustment to cut separators of various sizes.

Another object is the provision of means for holding and pressing groups of plates and separators together to facilitate their insertion within a battery jar.

Another object is the provision of a machine of the above character, which is simple in construction and operation and by means of which the cost of manufacture of storage batteries may be materially reduced.

Other objects and advantages of the invention will appear as the following description is read in connection with the accompanying drawings.

In the drawings:—

Figure 1 is a side elevation of the machine.

Fig. 2 is an end elevation.

Fig. 3 is a top plan view.

Fig. 4 is an enlarged section on the line 4—4 of Fig. 2.

Fig. 5 is a similar view on the line 5—5 of Fig. 1.

Referring to the drawings in detail, wherein like characters of reference denote corresponding parts, the machine is made up of a frame which is designated at 10 and which includes spaced upper and lower guide members 11 having openings 12 therein. Mounted for vertical movement in these openings are rods 13, whose upper ends are formed to receive the binding posts of a battery cell as indicated at 14. The lower ends of these posts are provided with stop collars 15 which serve to limit their upward movement. Collars 16 are also carried by the rods, while surrounding the rods and interposed between these collars and the lower guide member 11 are springs 17 which serve to yieldingly maintain the posts in raised position. The lower ends of the posts 13 are connected by an equalizing link 18, which in turn has connected thereto by means of links 19, a foot pedal 20 which is pivotally secured to the frame as shown at 21. The structure just described provides adjustable chucks which receive the binding posts of the battery cell, as will be hereinafter described.

The frame 10 supports a table 22, upon which is mounted a separator gage 23 and an adjustable stop 24, the latter being provided with a spring 25 for yieldingly holding it in position. Also mounted upon the table 22 is a shearing blade 26, one end of which is pivotally mounted as shown at 27 while the opposite end has connected thereto an arm 28. This arm has secured to one end a spring 29 which is in turn secured to the frame as shown at 30. Also connected to the arm 28 is one end of a rod 31 whose opposite end is connected to a foot lever 32 as shown at 33, the said lever being pivotally mounted upon the frame as shown at 34. The lever is normally maintained in raised position and the shearing blade likewise raised by means of a spring 35.

Secured to the frame are spaced brackets 36 and pivotally mounted upon each of these brackets by means of a hinged pin 37 is one member 38 of a group press, the jaws 39 of which are adapted to receive between them a group of plates and separators for insertion in a battery cell. The jaws 39 are adjusted by means of an adjusting screw 40.

In the use of the invention, the positive and inactive groups of the battery plates are slipped together and the cover placed in position. The binding posts are then positioned in the seats 14 of the adjustable chucks and the foot lever 20 depressed to properly position the groups, the chuck being held in adjusted position by means of a toothed bar 41 which engages the lever 20. The size of the separators are then measured and the gage 23 properly adjusted with the separators positioned against the adjustable stop 24. The foot lever 32 is then depressed to operate the shearing blade and cut the required quantities of separators for the battery. The separators are then placed between the plates and the jars slipped over the groups, whereupon the foot lever 20 may be released and the jar placed within a battery box.

If the plates are warped and the groups will not enter the jars, the said groups are placed between the jaws of the press and the screw 40 adjusted and the foot lever 20 released, the adjustment of the screw 40 serving to straighten out the plates. Another set of groups may then be placed within the chucks and the separators placed in position and the jar fitted over the groups. The lever 30 may again be released and the jar placed within a battery box. By releasing the screw 40 of the press the groups will be placed within the adjustable chuck and the jar may then be placed over the groups.

The invention is susceptible of various changes in its form, proportions and minor details of construction and the right is herein reserved to make such changes as properly fall within the scope of the appended claims.

Having described the invention what is claimed is:—

1. A storage battery machine comprising adjustable binding post receiving members, a separator gage, a cutting element, an adjustable stop for positioning the separators with respect to the cutting element and means whereby groups of separators and battery plates may be pressed together to facilitate their insertion in a battery jar.

2. A storage battery machine comprising a pair of vertically movable spaced binding post receiving members, means for adjustably positioning the members, a separator gage, a cutting element, an adjustable stop for positioning the separators with respect to the cutting elements and means whereby the groups of separators and battery plates may be pressed together to facilitate their insertion in a battery jar.

3. A storage battery machine comprising adjustable binding receiving members, a separator gage, a pivotally mounted shearing blade, an adjustable stop for positioning the separators with respect to the blade and means whereby the groups of separators and battery plates may be pressed together to facilitate their insertion in a battery jar.

4. A storage battery machine comprising adjustable binding post receiving members, a separator gage, a cutting element, an adjustable stop for positioning the separators with respect to the cutting element and means located above the post receiving members whereby the groups of separators and battery plates may be pressed together to facilitate their insertion in a battery jar.

5. A storage battery machine comprising adjustable binding post receiving members, a separator gage, a cutting element, an adjustable stop for positioning the separators with respect to the cutting element and means including pivotally mounted adjustable arms, whereby groups of separators and battery plates may be pressed together to facilitate their insertion in a battery jar.

In testimony whereof I affix my signature.

ROBERT F. WHERLAND.